US008910596B2

(12) United States Patent
Finlan

(10) Patent No.: US 8,910,596 B2
(45) Date of Patent: Dec. 16, 2014

(54) ADJUSTABLE BUCKLE AND COLLAR

(75) Inventor: John Finlan, Cheshire (GB)

(73) Assignee: John Finlan, Cheshire (GB)

( * ) Notice: Subject to any disclaimer, the term of this patent is extended or adjusted under 35 U.S.C. 154(b) by 0 days.

(21) Appl. No.: 13/596,388

(22) Filed: Aug. 28, 2012

(65) Prior Publication Data

US 2012/0325164 A1 Dec. 27, 2012

Related U.S. Application Data

(63) Continuation of application No. PCT/GB2011/000260, filed on Feb. 25, 2011.

(30) Foreign Application Priority Data

Mar. 2, 2010 (GB) .................................. 1003400.7
Mar. 2, 2010 (GB) .................................. 1003402.3

(51) Int. Cl.
*A01K 27/00* (2006.01)
(52) U.S. Cl.
CPC ............. *A01K 27/001* (2013.01); *A01K 27/005* (2013.01)
USPC .......................................... 119/863; 119/856
(58) Field of Classification Search
USPC ................................. 119/863, 856
See application file for complete search history.

(56) References Cited

U.S. PATENT DOCUMENTS

| 4,646,401 | A | 3/1987 | Morell |
| 5,038,719 | A | 8/1991 | McDonough |
| 5,450,820 | A | 9/1995 | Kirsch |
| 5,530,997 | A | 7/1996 | Tessari et al. |
| 5,749,127 | A | 5/1998 | Hsieh |
| 6,694,923 | B1 | 2/2004 | Fouche |
| 6,715,449 | B1 | 4/2004 | Jordan |
| 7,640,639 | B2 | 1/2010 | de Bien |
| 2006/0277894 | A1 | 12/2006 | Lin |
| 2006/0283403 | A1 | 12/2006 | Okai |

FOREIGN PATENT DOCUMENTS

| DE | 232 052 | 3/1911 |
| DE | 202 05 797 U1 | 9/2002 |
| EP | 0644340 | 3/1995 |
| FR | 2 841 739 | 1/2004 |
| GB | 616729 | 1/1949 |
| WO | WO 2007/114754 | 10/2007 |
| WO | WO 2008/155791 | 12/2008 |

OTHER PUBLICATIONS

United Kingdom Application No. GB1106895.4 Search Report dated Aug. 19, 2011.

*Primary Examiner* — Kristen C Hayes
(74) *Attorney, Agent, or Firm* — Woodard, Emhardt, Moriarty, McNett & Henry LLP

(57) ABSTRACT

A clip buckle assembly suitable for use in an animal collar has two releasably interlockable buckle members and an adjustment means having a tongue extending between a buckle member and a stop at the end of the tongue. The tongue is arranged to pass through a slider having a gripping means configurable between an open configuration, wherein the first tongue is free to slide through the first slider and a closed configuration, wherein the first tongue is held locked against the first slider when the first slider is urged in a slackening direction from the proximal towards the distal end of the first tongue, whereby the slider is arranged to be fixable against slackening at any of a plurality of positions along the first tongue. The stop is arranged to prevent the tongue from disengaging from the slider when the first slider is urged in the slackening direction.

16 Claims, 5 Drawing Sheets

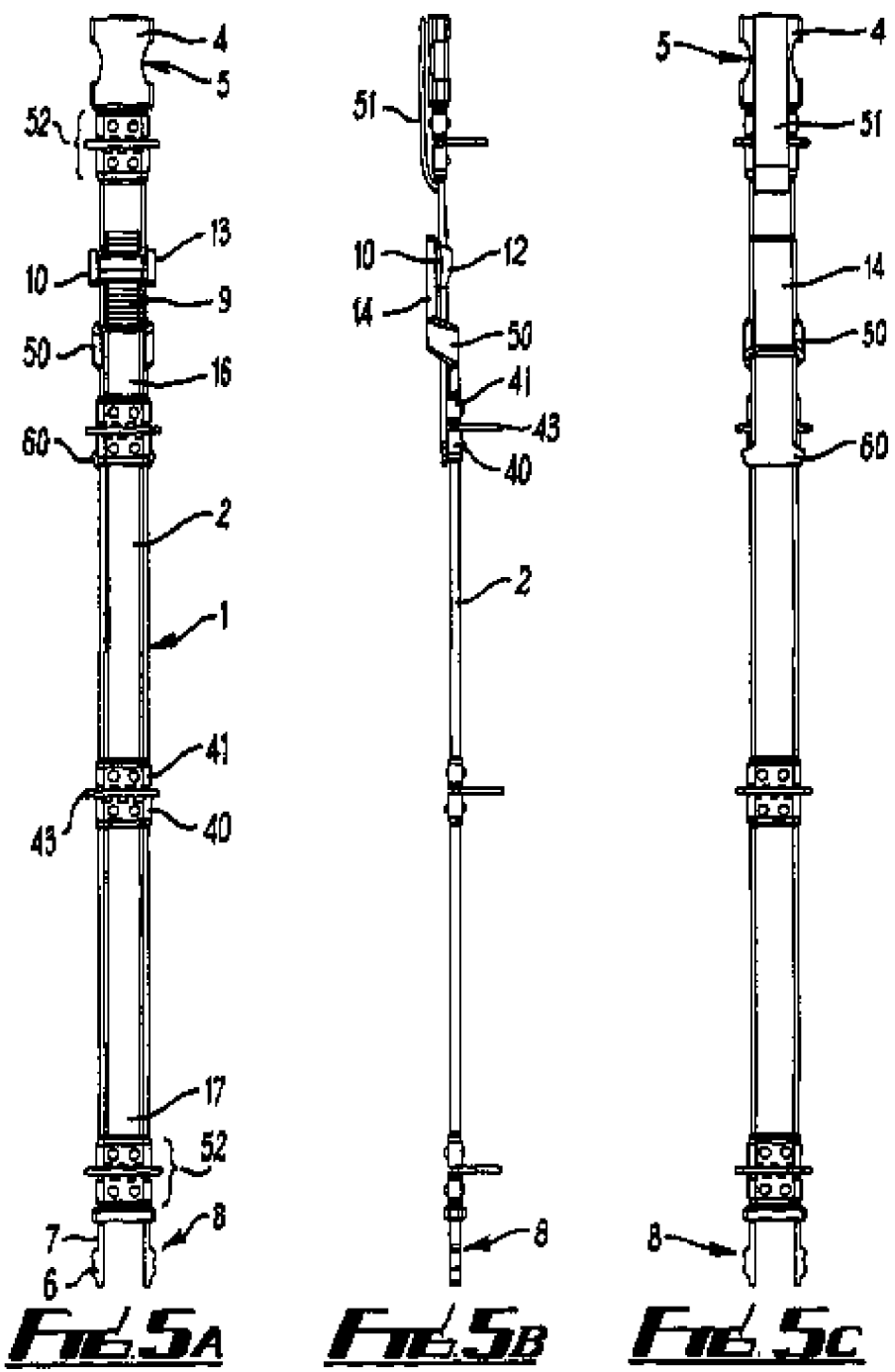

ADJUSTABLE BUCKLE AND COLLAR

CROSS REFERENCE TO RELATED APPLICATIONS

This application is a continuation of International Application No. PCT/GB2011/000260, filed Feb. 25, 2011, which claims the benefit of United Kingdom Application No. 1003400.7 filed Mar. 2, 2010 and United Kingdom Application No. 1003402.3 filed Mar. 2, 2010, the entire disclosures of which are hereby incorporated by reference.

FIELD OF THE INVENTION

The present invention is concerned with adjustable clip buckles for use in applications where it is desirable to both fasten ends of straps together and also to adjust the spacing between the strap ends when fastened. The invention is particularly useful for adjustable buckles for animal collars and the like, and the invention relates to collars and straps fastened by adjustable clip buckles

BACKGROUND OF THE INVENTION

A clip buckle comprises two buckle members releasably interlockable to fasten together. Such clip buckles are well known in the prior art and are buckles of the type having one buckle member with resilient arms received in a housing in the other buckle member, the housing having coupling apertures to receive coupling tabs provided on the resilient arms. The clip buckle can be simply engaged by pushing the resilient arms into the housing so that the tabs lockingly engage in the coupling apertures, and disengaged for opening by squeezing the coupling tabs together to disengage the tabs from the coupling apertures to thus permit the resilient arms to be pulled out of the housing. Such clip buckles enable the ends of straps or webbing to be rapidly fastened together and disengaged, but do not allow for adjustment of the spacing between the strap ends when fastened.

Typically, to enable such tightening or slackening adjustment to be made, one of the members of the clip buckle may be attached to its respective strap at an adjustable fastening. A typical prior art adjustable fastening involves the strap passing through first and seconds slots of an adjuster at the buckle member so that the strap doubles back over itself whereby friction of the strap against itself holds the strap in a tightened configuration. To slacken the strap, the adjustable fastening is positioned in a released configuration to allow the strap to slide through the two slots without being forced against itself.

A problem with such a tightening and slackening arrangement is that it is easy to overtighten the strap. Furthermore, once the strap is overtightened, release may be made difficult by the need to tighten the strap even further in order to bring the adjustable fastening into the released configuration. Where the buckle is used to fasten a strap around a fragile object, this may result in damage. Similarly, problems of bruising or choking may be caused if the buckle is to be used for attachment of a strap around a human or animal body part (such as, for instance, a dog collar or a wrist strap).

The strap, doubling back on itself, and the use of friction to hold the adjusted strap in place also mean that an excessive length of strap is generally present with some secondary fastener required to hold the free strap in place.

Tightening arrangements in the form of a toothed tongue combined with a ratchet are known in the prior art, for instance, as part of adjustment means for the tightening of ski-boots and the like. See, for instance, U.S. Pat. No. 4,646, 401. Application for animal collars is disclosed in U.S. Pat. No. 6,715,449 and WO2008/155791. However, such prior art arrangements are prone to accidental release from the animal whilst tightening or slackening.

Hence there is a need for adjustable buckle assemblies which address some or all of the problems of the prior art as set out above.

Leash structures, collars, harnesses and the like are available in various designs intended to control domesticated animals. A common arrangement is the use of a collar fastened around the neck of an animal, with the collar attached to a leash. The person controlling the animal grasps the proximal end of the leash and the distal end of the leash is attached to the collar.

With such a collar arrangement, it is desirable that the leash is easily attachable to the collar and can be removed, for instance, to allow the animal to roam freely. It is also desirable that the collar should be readily attachable around the animal's neck and removable therefrom, and also that the collar should be readily and rapidly adjustable to fit an animal's neck.

Domestic animals, such as dogs, may need to be brought under control rapidly depending upon the prevailing circumstances. In such a situation, to protect the safety of the dog or the safety of others, it may be necessary to rapidly attach a leash to a dog already wearing a collar, or it may be necessary to attach a collar to the dog rapidly, and to adjust it around the animal's neck, so that a leash can subsequently be attached to bring the dog under control.

As a domestic animal ages, for instances as a dog grows from a puppy into an adult, the size of the animals neck may increase requiring that the collar be adjusted in order to fit the animal securely, without causing choking, but without the collar being so loose that it is hazardous because of items becoming caught behind the collar. Hence it is desirable that a collar should be adjustable around an animal's neck.

Prior art collars, particularly dog collars, have used conventional buckle and strap arrangements, with a pin-buckle adjustable on a strap with poles through which the pin passes. Other known arrangements use, for instance, Velcro™ straps in order to provide adjustment of the collar. Another known arrangement uses a toothed belt and ratchet combination where the collar is fastened by inserting the distal end of a toothed belt into a slider having a ratchet, and the belt is tightened by pushing the toothed belt into the slider with the ratchet grasping the toothed belt.

The usual manner for attachment of a leash to a collar is the use of a D-ring fastened to the collar in combination with a clip at the distal end of the leash. To attach the leash to the collar, the clip is attached to the D-ring. Typical clips include spring clips such as Karabiner arrangements which have a sprung side arm, maillon type arrangements (also known as quick link) or shackles where the clip is openable by means of a screw arrangement or, for instance, slide clips where a section of the clip is slidably removable to allow a gap to be formed through which a D-ring can pass in order to engage with a clip. All of these arrangements require some degree of manipulation when engaging the clip with the D-ring on the collar. Typically, a collar is only provided with a single D-ring and the collar must be moved around the animal's neck in order to bring the D-ring into proximity with the person controlling the animal so that the leash can be attached.

Quick-connect coupling assemblies are known in the prior art and have been applied to use for attaching leashes to animal collars or for closing an animal collar around the animal's neck. Such arrangements are described, for instance, in U.S. Pat. No. 7,640,639 and in U.S. Pat. No. 5,450,820.

A number of problems are present in prior art arrangements for animal collars and leashes. The presence of an adjustment means for tightening or slackening the collar around the animal's neck may lead to a large proportion of the perimeter of the collar being unusable for position of a leash attachment means. Furthermore, the usual practice of only providing a single leash attachment means on a collar may lead to the person controlling an animal spending time shuffling the collar around the animals neck in order to find the leash attachment means prior to attaching a leash. This may be dangerous to the animal or to others when a leash needs to be attached rapidly. Furthermore, some animals may be prone to struggling against the attachment of a leash and so make it difficult for the person controlling the animal to manoeuvre the collar.

A further problem with the prior art is the need for manipulation when adjusting a collar to fit an animal's neck. Simple systems which clip around an animal's neck may then require manipulation in order to adjust the collar to the correct internal diameter. For arrangements such as a buckle and strap or a prior art toothed belt and ratchet, considerable manipulation is required in order to insert the strap into the buckle or the toothed belt into the slider arrangement prior to adjusting the system to match the animal's neck diameter. The animal may break free whilst a person is attempting to fasten then tighten a collar.

Hence, there is a need for a collar arrangement and for collar and leash assemblies which overcome some or all of the problems set out above.

SUMMARY OF THE INVENTION

One object of the invention, amongst others, is to provide an adjustable buckle assembly which is easily adjustable to be tightened without need for excessive manipulation and without risk of excessive tightening. Another object of the invention is to provide a buckle assembly which may be tightened and slackened on a strap without need for a loose end of a free strap to be present. Another aspect of the invention is to provide adjustable buckle assemblies of use for, for instance: life vests, water buoyancy jackets, general clothing jackets; belts—including belts for clothing; cable ties, such as electrical cable ties; attachment of gas tanks for scuba diving, to a person or for carriage on a vessel; attachment of blankets, rugs, head collars, bridles, girth straps and the like to horses; child restraints, for instance for buggy and car seats; intensive care hospital patients e.g. for securing of intravenous drips, catheters and the like to a patient or to a support means; sport and leisure equipment such as rucksacks, backpacks and sports bags; marine applications—sail ties and securing of items on a vessel; and other similar applications.

A further object of the invention is to provide a collar for an animal which is adapted to permit easy and rapid attachment of a leash to the collar, so that the animal can be brought under control rapidly. A further object of the invention is to provide a collar and leash assembly where the leash is readily and rapidly detachable from the collar by an owner. Another object of the invention is to provide a collar which can be rapidly and easily fastened around an animal's neck, or removed therefrom, and which is also easily adjustable to fit the animal's neck in a snug manner without need for excessive manipulation and without risk of choking the animal.

A first aspect of the invention provides a clip buckle assembly comprising two releasably interlockable buckle members and an adjustment means wherein the adjustment means comprises a first tongue extending between the first buckle member at a proximal end of the first tongue and a first stop at a distal end of the first tongue, and a first slider through which the first tongue is arranged to pass, wherein the first slider comprises a first gripping means configurable between an open configuration, wherein the first tongue is free to slide through the first slider and a closed configuration, wherein the first tongue is held locked against the first slider when the first slider is urged in a slackening direction from the proximal towards the distal end of the first tongue, whereby the slider is arranged to be fixable against slackening at any of a plurality of positions along the first tongue, and wherein the first stop is arranged to prevent the tongue from disengaging from the slider when the first slider is urged in the slackening direction.

A second aspect of the invention provides a collar for an animal comprising a strap and a clip buckle assembly according to the first aspect of the invention operably attached to first and second ends of the strap for closing the strap into an annulus around an animal's neck.

A third aspect of the invention provides a collar and leash assembly comprising a collar according to the second aspect of the invention and leash comprising a coupling member at its distal end, the coupling member adapted to engage with one of the plurality of the leash attachment means of the collar to provide a coupling arrangement.

BRIEF DESCRIPTION OF THE DRAWINGS

Specific embodiments of the present invention will now be described, by way of example only, with reference to the accompanying drawings in which:

FIGS. 5A to 5C show plan, side and bottom plan views of a second embodiment of an animal collar according to the second aspect of the invention, having a clip buckle assembly according to the first aspect of the invention.

FIG. 6A shows a side cross-sectional through the clip buckle assembly a long axis X-X, as shown in FIG. 6B. FIG. 6B shows a plan view and FIG. 6C shows a conventional side view.

FIG. 7A shows a side view of the interlocked connection joint with FIG. 7B showing a plan view. FIG. 7C shows a perspective view with FIGS. 7D and 7E showing perspective views of the individual, first and second interlocking members of the interlocking connection joint with the D-ring, used as key, removed.

DETAILED DESCRIPTION OF THE INVENTION

Figure 1:
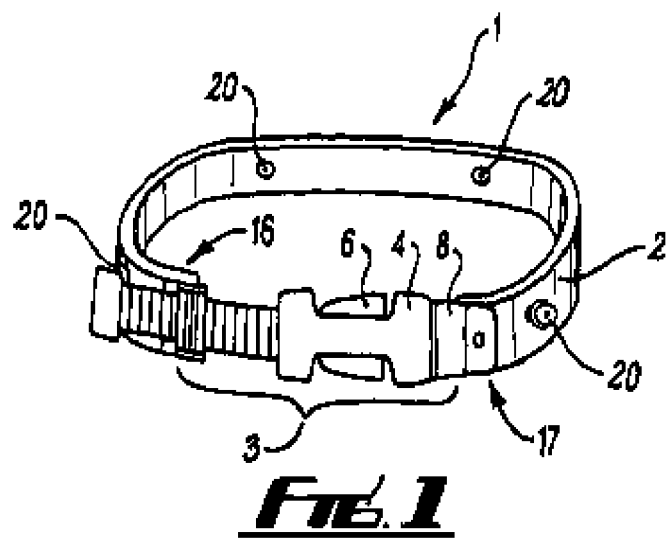
FIG. 1 shows a schematic perspective view of a first embodiment of an animal collar according to the second aspect of the invention with a clip buckle assembly according to the first aspect of the invention.

The clip buckle assembly of the first aspect of the invention comprises two releasably interlockable buckle members and an adjustment means wherein the adjustment means comprises a first tongue or belt extending between the first buckle member at a proximal end and a first stop at a distal end of the first tongue, and a first slider arranged to be fixable against slackening at any of a plurality of positions along the first tongue, and the first stop arranged to prevent the tongue from disengaging from the slider. The first slider comprises a first gripping means configurable between an open configuration, wherein the first tongue is free to slide through the first slider and a closed configuration, wherein the first tongue is held locked against the first slider when the first slider is urged in a slackening direction from the proximal towards the distal end of the first tongue, and wherein the first stop is arranged to prevent the tongue from disengaging from the slider when the first slider is urged in the slackening direction.

The first tongue or belt may be rigid or may be flexible, and may be any suitable material. Typically, the first tongue or belt (hereinafter referred to as a tongue) may be formed from a polymeric material such as a synthetic rubber or the like.

The clip buckle assembly is suitably attached to an elongate strip of material such as webbing, strap, a collar or the like (hereinafter referred to as strap for the sake of brevity) by the first slider being attached to (at or near) the first end of the strap, whereby the first buckle member is adjustably attached to a first end of the strap, and second buckle member being attached to a second end of the strap. Hence the first and second ends may be fastened together adjustably by means of the clip buckle assembly of the invention.

The first gripping means may, for instance, be a cam buckle arranged to press the first tongue towards the first slider in the closed configuration whereby the first tongue is held locked against the first slider by the cam buckle when the first slider is urged in a slackening direction from the proximal towards the distal end of the first tongue.

Cam buckles are known in the art, and are buckles employing a cam or bulge to press down onto a belt or tongue in the closed configuration, with the belt or tongue free to slide between the cam buckle, and the holder into which the cam buckle is mounted, in the open configuration. For this invention, the cam buckle will typically be a plate rotatably mounted at a first edge of the plate about an axle held by the first slider. The plate may be provided with a bulge or cam near the first edge so that the plate is urged towards the belt or tongue by rotation about the axle, the cam will push into the tongue and press it against the first slider. The cam buckle is suitably mounted so that when in the closed configuration, tugging on the tongue towards the slackening direction serves to further pull the cam downwards towards the tongue by rotation about the axle. The cam buckle may be released to the open configuration by pulling the plate outwards so that the cam disengages from the tongue by rotation of the plate around the axle, leaving a gap between the first edge of the plate and the slider through which the tongue is free to slide.

The cam may be provided with ribs, teeth, knurling or projections to facilitate gripping of the tongue by the cam in the closed configuration. Suitably, the tongue may be of an elastomeric material such as a polymeric material, e.g. rubber or synthetic rubber, whereby gripping of the tongue by squeezing it between the cam and the slider is facilitated. Alternatively, or additionally, the tongue may be provided with ribs, teeth, knurling or projections in order to facilitate gripping of the tongue by the cam in the closed configuration.

The first tongue may be a first toothed tongue and the first gripping means may comprise a first ratchet biased to press against the first toothed tongue, wherein the first toothed tongue and first ratchet are mutually arranged so that the first slider is moveable along the first toothed tongue to when urged in a tightening direction along the first toothed tongue, from the distal towards the proximal end of the first toothed tongue, and wherein the first ratchet is arranged to lock the first slider against the first toothed tongue when the first slider is urged in a slackening direction from the proximal towards the distal end of the first toothed tongue. The first ratchet may be biased by a suitable biasing means, such as a spring, to press against the first toothed tongue.

The first slider suitably comprises a means for disengaging the first ratchet from the first toothed tongue whereby the first slider is moveable in the slackening direction when the first ratchet is disengaged. This allows the tightening means to be easily slackened. A suitable means for disengaging the first ratchet is a lever operably connected to the first ratchet through a fulcrum in the slider whereby the lever, when urged towards the toothed tongue, acts against the biasing means to release the ratchet from the toothed tongue, releasing the toothed tongue to slide through the slider. The first slider may be further provided with a means for holding the first ratchet in a disengaged configuration, such as a latch in the form, of a locking switch, such as a slide-lock mechanism to hold the ratchet in the disengaged configuration.

Tightening arrangements in the form of a toothed tongue combined with a ratchet are known in the prior art, for instance, as part of adjustment means for the tightening of ski-boots and the like. See, for instance, U.S. Pat. No. 4,646,401. Application for animal collars is disclosed in U.S. Pat. No. 6,715,449 and WO2008/155791. However, such prior art arrangements typically permit the tongue used for adjustment to be withdrawn from the slider arrangement. For many applications this arrangement may be inconvenient and time consuming. For instance for use as a buckle for an animal collar, withdrawal of the tightening tongue from the slider would necessitate rethreading in order to close the collar in an annulus about an animal's neck, requiring lengthy and accurate manipulation. The use of a stop at the distal end of the tongue means that the adjustment tongue of the present invention cannot be accidentally withdrawn from the slider. Opening and closing is achieved by means of the clip buckle rather than by withdrawing the tongue from the slider and re-entering it into the slider. Hence, the combination of the clip buckle and tightening means with tongue comprising a stop at its distal end permits the advantages of the prior art tightening arrangements to be used without the risk of accidental withdrawal of the tightening tongue and with a rapid and easy means for opening and closure of the collar by the clip buckle.

Furthermore, the arrangement of the invention provides the further advantage for an animal collar that the collar may be placed around an animal's neck by having the clip buckle fastened and the adjustment means in a slackened configuration, with the stop preventing the tongue from disengaging from the slider. In this way, an already fastened collar may be slipped over the animals head and then the collar tightened around the animal's neck by pulling or pushing the tongue through the slider to achieve tightening.

The stop may be unitarily formed with the tongue, and/or with the member of the clip buckle to which the tongue is attached, for instance as a single polymeric moulding. Another option is that the stop may be a separate stop fastened to the distal end of the tongue, for instance by a screw or rivet, or the stop may be simply a nut and bolt or rivet arrangement passing through the tongue and acting as a stop. The stop may be arranged to abut against the slider whereby the tongue is prevented from unintended disengagement from the slider, or as is set out hereinbelow, the stop may engage another part of the assembly to prevent disengagement, such as a sleeve forming part of the support for the slider through which the tongue may slide but which is too constricted to allow the stop to pass therethrough.

A particular benefit of a tightening means comprising a toothed tongue and ratchet, as set out above, is that a collar, webbing or strap with ends attached to the clip buckle assembly (via the slider) can be fastened around an object, using the clip buckle, with the adjustment means in a loose or slackened arrangement, and the tongue, collar or strap then simply tightened by pushing the ends of the strap towards each other without need for any complex manipulation. The tightening means is self-adjusting as the ends of the strap are urged together, but there is no opportunity for additional leverage to be applied when tightening, such as there is for conventional adjustment arrangements, where a strap passing back on itself through the buckle may be tugged and over-tightened.

The clip buckle assembly may further comprise a further or second adjustment means, i.e. situated on the other side of the buckle to the first tightening means. The further adjustment means may comprise a second tongue extending between the second buckle member at a proximal end of the second tongue and a second stop at a distal end of the second tongue, and a second slider through which the second tongue is arranged to pass. The second slider may comprise a second gripping means configurable between an open configuration, wherein the second tongue is free to slide through the second slider and a closed configuration, wherein the second tongue is held locked against the second slider when the second slider is urged in a slackening direction from the proximal towards the distal end of the second tongue. Hence, the second slider is arranged to be fixable at any of a plurality of positions along the second tongue and the second stop is arranged to prevent the tongue from disengaging from the slider when the second slider is urged in the slackening direction.

In this arrangement, the clip buckle assembly is suitable attached to a strap or the like by the first slider being attached to the first end of the strap, whereby the first buckle member is adjustably attached to (at or near) a first end of the strap, and the second slider being attached to (at or near) the second end of the strap, whereby the second buckle member is adjustably attached to a second end of the strap. Hence the first and second ends of the strap may be fastened together adjustably by means of the clip buckle assembly of the invention.

The features as set out for the first adjustment means are also applicable to the second adjustment means, and hence the second adjustment means may be an adjustment means with features as set out hereinbefore for the first adjustment means, but with the term "first" replaced by "second" mutatis mutandis.

The second aspect of the invention provides a collar for an animal comprising a strap and a clip buckle assembly according to the first aspect of the invention operably attached to first and second ends of the strap for closing the strap into an annulus around an animal's neck.

The collar of the second aspect may be a dog collar.

Preferably, the first tongue is arranged with its distal end against an inner face of the collar in use, and the first gripping means is arranged to be configurable between the open and closed configurations on the outside face of the collar in use. Similarly, the second tongue, if present, is preferably arranged with its distal end against an inner face of the collar in use, and with the first gripping means is arranged to be configurable between the open and closed configurations on the outside face of the collar in use.

This arrangement provides the advantage that the distal ends of the tongues of the adjustment means, and their respective stops, are kept protected from damage between the collar and the animal in use, reducing risk of their being bent or broken by the animal. The first slider, or an assembly holding the first slider, may comprise a sleeve with the first tongue is arranged to slide through the sleeve. Any second slider may also comprise a similar sleeve through which the second tongue is arranged to slide. This arrangement is useful for ensuring that the first tongue remains aligned within the slider when the clip buckle arrangement of the invention is used in an animal collar. Each sleeve is suitably positioned so that the distal end of the tongues of the respective adjustment means are positioned between the inner face of the collar in use, and the animal to which the collar is attached.

Each stop is adapted to prevent its respective tongue from disengaging from its respective slider when that slider is urged in the slackening direction. The stop may be arranged to engage with such a sleeve, as set out above, whereby the tongue is prevented from further slackening as the stop abuts the respective sleeve.

The collar of the invention suitably comprises one or more leash attachment means. The leash attachment means may be loops fastened to the collar and arranged to engage a clip at a distal end of a leash.

In one arrangement, the leash attachment means may be male or female coupling members adapted to engage with a complementary female or male coupling member at a distal end of a leash to provide a coupling arrangement between the collar and said leash.

These leash attachment means may be fastened to the collar by any suitable method, but preferably the collar may comprise a plurality of mount assemblies, each adapted to releasably hold a leash attachment means. This arrangement provides the advantage that the user of the collar may select how many leash attachment means to have on the collar and where to position leash attachment means around the perimeter of the collar, depending upon the behaviour patterns of the animal on which the collar is to be used. This disclosed arrangement of leash attachment means may be suitably employed with any animal collar and not just with the collar of the invention. Hence, an animal collar comprising a collar fastening means, such as a clip buckle, and a plurality of mount assemblies arranged for releasable attachment of leash attachment means, distributed along the collar, is disclosed.

In one arrangement disclosed here with respect to animal collars in general, as well as for use with the collar of the invention, the collar may be a modular arrangement wherein the strap comprises one or more strap segments attached to each other and to a buckle assembly (preferably, but not necessarily the adjustable clip buckle assembly of the first aspect of the invention) at interlockable connection joints provided at each end of each strap segment and at each end of the buckle assembly.

This allows a collar of a particular perimeter to be constructed to suit a particular animal by joining together and interlocking a number of strap segments by means of the interlockable connection joints. Suitably, a leash attachment means, such as a D-ring, may be used as a removable key for interlocking first and second coupling members of each interlockable connection joint together, with the interlockable connection joint also acting as a mount assembly to releasably fix the leash attachment means in place on the collar. Hence, a collar is disclosed wherein the interlockable connection joints are arranged to act as the mount assemblies adapted to releasably hold a leash attachment means. Each interlockable connection joint may comprise first and second interlocking coupling members each arranged to releasably attach to the same leash attachment means whereby the first and second coupling members form the interlockable connection joint at and through the leash attachment means.

For instance the straight arm of a D-ring may act as a connection shaft or rod onto which first and second coupling members of an interlockable connection joint may be clipped. Alternatively or additionally, the first and second coupling members of the interlockable connection point may simply both be clipped onto a connection rod to form a joint without a leash attachment means forming a part of the interlockable connection joint. This arrangement provides considerable versatility for providing customisation of a collar with respect to size and with respect to the number of leash attachment means distributed along the collar.

Hence, there is also disclosed an interlocking connection joint for a strap of an animal collar, the interlocking connection joint comprising first and second coupling members each comprising a means for attachment to a strap end, and the first and second coupling members arranged to releasably interlock.

The interlocking connection joint may further comprise a connection rod, with each coupling member comprising a means for releasable attachment to the connection rod, whereby the interlocking connection joint is formed by the first and second coupling members releasably attached to the connection rod.

The connection rod may be a portion of a leash attachment means, such as the straight portion of a D-ring. The means for releasable attachment to the connection rod may suitably be in the form of one or more C-clips provided on each of the first and second coupling members of the interlocking connection joint.

In another arrangement, one or more leash attachment means may be a male or female coupling member adapted to engage with a complementary female or male coupling member at a distal end of a leash to provide a coupling arrangement between the collar and said leash. This may be used to provide a "quick release-quick attach" coupling arrangement. This disclosed arrangement of leash attachment means may be suitably employed with any animal collar and not just with the collar of the invention.

The collar of the invention may further comprise a protective flap arranged to form a shield between the interlocked buckle members and the body of an animal at the inner face of the collar in use. This arrangement is advantageous in helping to prevent animal skin or hairs becoming trapped between the interlocking buckles of the clip buckle. This disclosed arrangement of leash attachment means may be suitably employed with any animal collar having a clip buckle and not just with the collar of the invention.

The annulus of the collar will provide a perimeter of length L, which is adjustable by means of the adjustable clip buckle and which may be provided with at least three leash attachment means along the strap whereby any point on the perimeter is no more than L/4 from a leash attachment means, measured around the perimeter. The length L of the perimeter is measured with the clip buckle assembly adjusted to its most slackened configuration so that L is as large as possible for the particular annulus formed. Clearly, if no point on the perimeter is less than L/4 from a leash attachment means in the slackest configuration of the collar, this constraint will also be met when the collar is tightened by adjustment of the clip buckle assembly of the invention. This disclosed arrangement of spaced leash attachment means may suitably be employed with any animal collar as well as with the animal collar of the invention.

Preferably, the collar comprises at least four leash attachment means mutually spaced apart along the perimeter, more preferably at least five.

The third aspect of the invention provides a collar and leash assembly comprising a collar according to the second aspect of the invention and leash comprising a coupling member at its distal end, the coupling member adapted to engage with one of the plurality of the leash attachment means of the collar to provide a coupling arrangement.

At least one leash attachment means may be a male or female coupling member adapted to engage with a complementary female or male coupling member at the distal end of the leash, and the female coupling member may be arranged to grasp the male coupling member on insertion and to hold the male coupling member to form the coupling arrangement. The female coupling member may further comprise a release means arranged to release the male coupling member from the coupling arrangement when actuated.

Such a coupling arrangement may be described as a quick-coupling, quick release coupling arrangement, in that the coupling arrangement is readily formed by merely aligning the male member with an opening in the female member and mating the two members. The coupling is self-locking and so no further manipulation is needed to provide the coupling arrangement between the leash and the collar.

Such quick coupling arrangements have been known in the prior art in a variety of forms, any of which may be suitable for the present invention. Examples of such couplings, which may be adapted for use in the present invention, are given, for instance in U.S. Pat. No. 5,450,820. Suitable quick-coupling arrangements may be made from any suitable rigid material such as a metal e.g. steel, or from a rigid polymer such as polyethylene, acetal, or the like.

The leash may comprise a universal joint arrangement connecting the female coupling member to the distal end of the leash. By "universal joint" it is meant that the joint between the female coupling member and the leash is arranged to permit substantially unencumbered movement of the female coupling member relative to the leash, about the joint over a solid angle of at least 2×Pi steradians.

The strap for the collar of the second and third aspects of the invention may be of any suitable material such as textile, polymer (e.g. nylon, Kevlar™, natural or synthetic rubber, neoprene, etc.), leather or the like. The strap may be reinforced by means of a suitable reinforcing means such as fibres, for instance, carbon fibres, textile, webbing, meshing, metal reinforcement or the like.

The leash attachment means for use in the second or third aspects of the invention may be loops fastened to the collar and arranged to engage a clip at a distal end of a leash. Typical clips used for leashes include spring clips, such as karabiner-type clips, maillon (quick-link) clips, where a metal ring is closed by a screw-gate, shackles and slide- or snap-lock clips. A gated aperture in the clip is openable to allow it to be clipped onto the leash attachment means in the form of a loop. The loop may be a rigid loop such as a circular ring or D-ring fastened to the collar, or, for instance, the loop may be a flexible loop such as a loop of flexible polymer or wire. In one suitable arrangement for a collar of the invention, the plurality of attachment means may comprise a strip extending along the strap, attached at or near the near first and second ends of the strap, and also attached to the strap at a intervals along the strip, so that loops are formed to act as leash attachment means between the strap, the strip and the attachment points.

In another arrangement, the leash attachment means may be part of a skeletal structure for the strap, with leash attachment means formed unitarily with a reinforcing spine for the strap and the strap formed by overmoulding of polymer around the skeletal structure.

Specific embodiments of the present invention will now be described, by way of example only, with reference to the accompanying drawings in which:

FIG. 1 shows a schematic perspective view of a first embodiment of an animal collar according to the second aspect of the invention with a clip buckle assembly according to the first aspect of the invention.

Figure 2A:
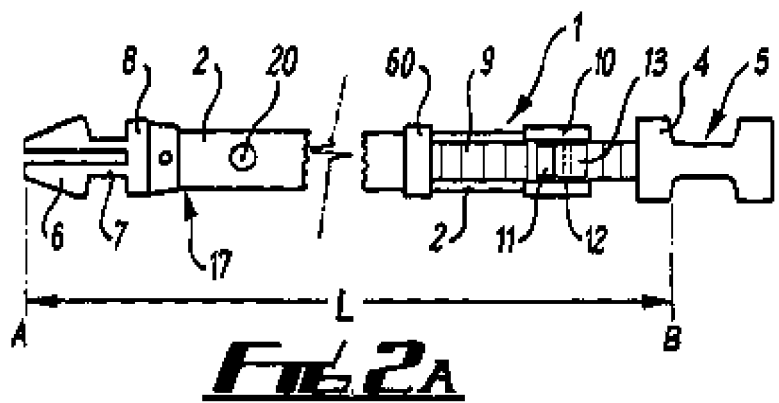
FIGS. 2A and 2B show plan and cross-sectional side views of the collar of the first embodiment with the clip buckle assembly in a disengaged state and with the strap extended to open out the collar.
Figure 2B:
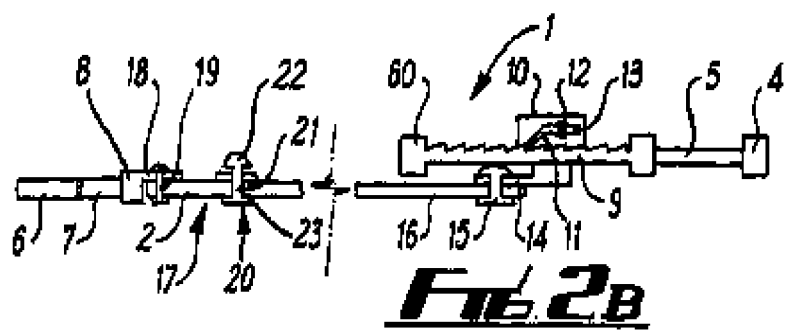

FIGS. 2A and 2B show plan and cross-sectional side views of the collar of the first embodiment with the clip buckle assembly in a disengaged state and with the strap extended to open out the collar.

Figure 3:
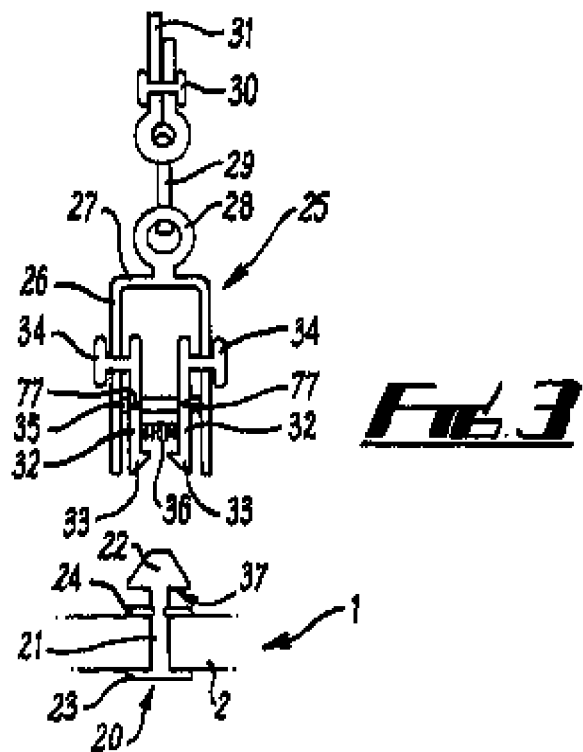
FIG. 3 shows a cross sectional schematic side view of a quick-couple, quick-release male-female coupling arrangement used for attaching a leash to the collar of the first embodiment.

FIG. 3 shows a cross sectional schematic side view of a quick-couple, quick-release male-female coupling arrangement used for attaching a leash to the collar of the first embodiment.

Figure 4:
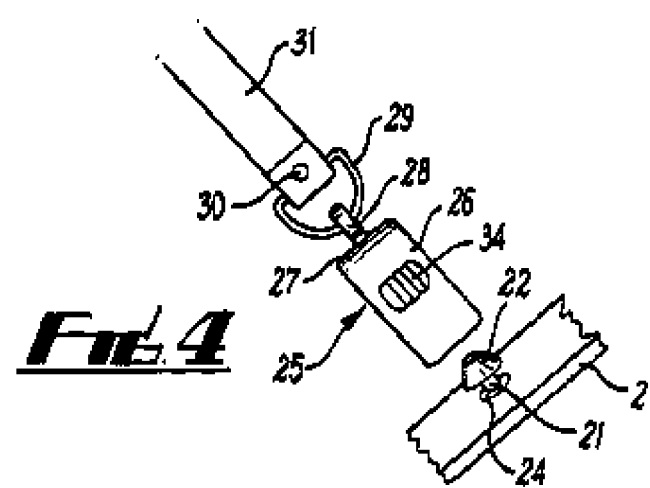
FIG. 4 shows a schematic perspective view of the coupling arrangement as shown in FIG. 3.

FIG. 4 shows a schematic perspective view of the coupling arrangement as shown in FIG. 3.

FIGS. 5A to 5B show plan, side and bottom plan views of a second embodiment of an animal collar according to the second aspect of the invention, having a clip buckle assembly according to the first aspect of the invention.

Figure 6A:
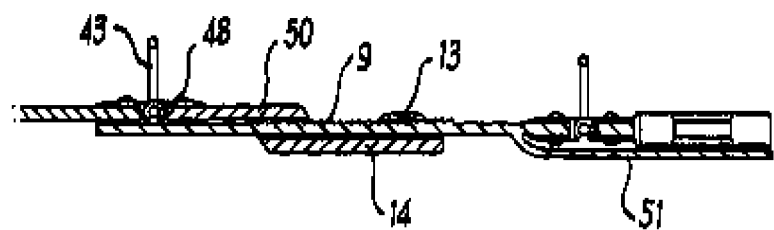
FIGS. 6A to 6C show further details of the clip buckle assembly of the second embodiment shown in FIGS. 5A to 5C.
Figure 6B:
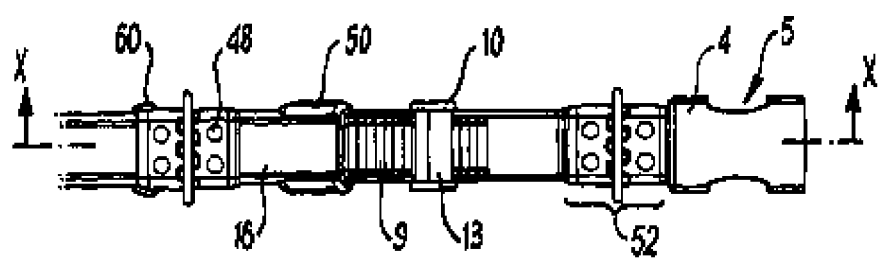
Figure 6C:
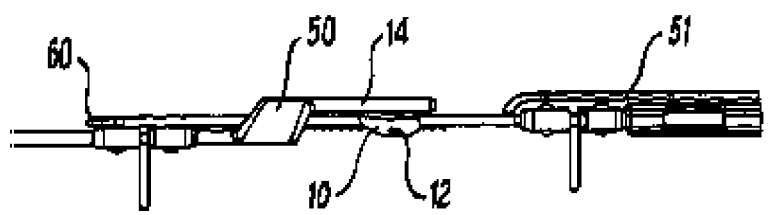

FIGS. 6A to 6C show further details of the clip buckle assembly of the second embodiment shown in FIGS. 5A to 5C. FIG. 6A shows a side cross-sectional through the clip buckle assembly a long axis X-X, as shown in FIG. 6B. FIG. 6B shows a plan view and FIG. 6C shows a conventional side view.

Figure 7A:
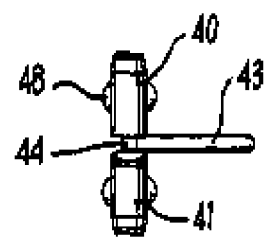
FIGS. 7A to 7E show details of the interlockable connection joints used in the second embodiment of the animal collar, as shown in FIGS. 5 and 6. For these interlockable connection joints, a D-ring is used as a connection key.
Figure 7B:
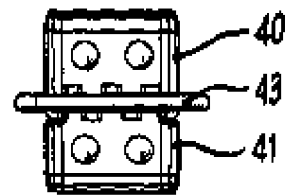
Figure 7C:
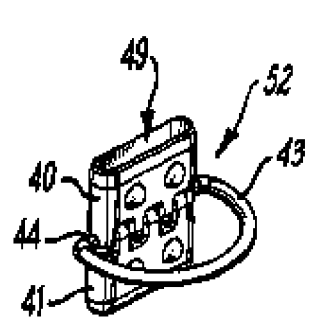
Figure 7D:
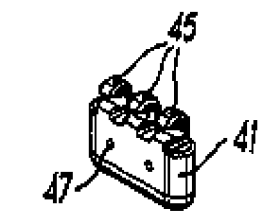
Figure 7E:
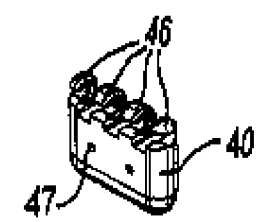

FIGS. 7A to 7E show details of the interlockable connection joints used in the second embodiment of the animal collar, as shown in FIGS. 5 and 6. For these interlockable connection joints, a D-ring is used as a connection key. FIG. 7A shows a side view of the interlocked connection joint with FIG. 7B showing a plan view. FIG. 7C shows a perspective view with FIGS. 7D and 7E showing perspective views of the individual, first and second interlocking members of the interlocking connection joint with the D-ring, used as key, removed.

Turning to FIGS. 1, 2A and 2B, these show a collar 1 made up of a strap 2 which is closable into an annular loop by means of a buckle assembly 3. The clip buckle assembly according to the first aspect of the invention includes a clip buckle comprising a first member 4 having a housing 5 for receiving resilient tabs 6 on coupling arms 7 of a second buckle member 8.

The first buckle member 4 is attached to a toothed tongue 9 and a slider 10 is arranged so that the toothed tongue 9 passes through it. The toothed tongue 9 has a stop 60 at its distal end which prevents the slider 10 from sliding or being pulled off the distal end of toothed tongue 9. The slider 10 holds a ratchet 11 mounted on a rod 12 which is fastened to the slider 10. A lever 13 is operably connected to the ratchet 11 and a spring (not shown) is positioned in the slider to urge the ratchet 11 towards to the toothed tongue 9 to engage with the teeth.

The teeth on toothed tongue 9 are asymmetrically shaped, with shallow sloping faces (at say 20° to the length of the tongue) on the sides of the teeth towards the end of the toothed tongue 9 with the stop 60 and with steep faces (at say 90° to the length of the tongue) on the sides of the teeth towards the proximal (first buckle 4) end of the toothed tongue 9.

The slider 10 further comprises a mount 14 through which a rivet 15 passes to secure the slider to a first end 16 of the strap 2. The second buckle member 8 is attached to the second end 17 of the strap 2 by a mount 18 through which a rivet 19 passes to attach the second buckle member 8 to the strap 2. Four leash attachment means 20 are distributed along the length of the strap 2. A detailed cross sectional view of a leash attachment means 20 is also shown in FIG. 3. In this embodiment, the leash attachment means 20 is a male coupling member having a stem 21, a frusto-conical head 22 at one end of the stem 21 and a retaining plate 23 at the other end of the stem 21. A circlip or fastener plate 24 engages with a groove in the stem 21 to hold the leash attachment means in place on the strap 2 in a manner such that the stem 21 and frusto-conical head 22 form a mushroom-shaped protrusion on the outer face of the collar 1.

In use, the open collar 1 is slackened prior to its attachment around an animal's neck to form an annular loop. Slackening is achieved by pressing the lever 13 towards the toothed tongue 9 in order to release ratchet 11 from its engagement with the teeth of the toothed tongue 9. In this released configuration, the toothed tongue 9 can be slid through the slider 10 until the end stop 60 engages with the body of the slider 10. Lever 13 is then released and the spring (not shown) biases the ratchet 11 back in to contact with the toothed tongue 9. The teeth on the tongue are oriented so that as the first buckle member 4 is pushed towards the slider 10 the ratchet 11 can slide over the teeth and allow the toothed tongue 9 to pass freely through the slider 10. However, any attempt to move the first buckle member 4 in the opposite direction (i.e. slackening) will lead to the ratchet 11 engaging with the teeth of the toothed tongue 9 and preventing movement.

In another arrangement (not shown), a lock mechanism such as a sliding lock mechanism may be provided within the slider 10 to hold the ratchet 11 in a disengaged configuration whilst adjustments are being made.

With the collar in its slackened configuration, it can be wrapped around the neck of an animal and formed into a closed annular loop by inserting the arms 7 of the second buckle member 8 into the housing 5 of first buckle member 4 so that the tabs 6 lockingly engage in the housing 5. The collar 1 can then be tightened around the animal's neck by urging the first 16 and second 17 ends of the strap 2 towards each other. This results in the slider 10 moving along the toothed tongue 9 in a direction towards the first buckle member 4 with the ratchet 11 passing freely over the sloping surfaces of the teeth of toothed tongue 9. Movement of the slider 10 back over the teeth is prevented by their steep faces on the tooth edges facing towards the first buckle member 4. The ratchet 11, biased towards the toothed tongue 9 by the spring (not shown) engages with these sharps edges of the teeth to prevent the slider moving back towards the stop and so prevents slackening of the collar.

The leash attachment means are spaced along the strap 2 such that even when the collar is in its slackest configuration, no point on the perimeter of the collar is more than L/4 from a leash attachment means measured around the perimeter. This measurement is made with the collar in the configuration shown in FIG. 2A with the collar in an open arrangement, laid on a flat surface, and with the length L measured between the points A and B as shown, but with the stop 60 abutting the slider 10 so that the collar is in its slackest configuration.

FIGS. 3 and 4 show the coupling arrangement between a leash 31 and the collar 1 of the second aspect of the invention. The coupling arrangement is a quick-connect, quick-release arrangement with the male coupling member 20 as set out above. The female coupling member 25 has a body 26 in the form of a hollow cylinder with a cap 27 furnished with an attachment loop 28 through which a D-ring 29 passes. The attachment loop 28 may be attached to the cap at a swivelling joint to assist in providing a universal joint connection between the leash and the collar The leash 31 passes through the D-ring 29 and is folded back upon itself and secured by a rivet 30 to hold the D-ring and female coupling member 25 in place.

Towards the open end of the body 26 of the female coupling member 25 two levers 32 are mounted on central fulcrums 77 where they pass through a plate 35 in the body 26. The distal ends of the levers are provided with teeth 33 and the proximal ends of the levers 32 are provided with buttons 34 to act as release means as set out herein below. A spring 36 is positioned between the levers 32 on the distal side of the levers from the fulcrums 77.

In use, the body 26 of the female coupling member 25 is grasped by a person and aligned, as shown in FIG. 3 and FIG. 4, with its open end facing towards a male coupling member 20 on the collar 1. The body is pushed towards the male coupling member 20 so that the teeth 33 pass over the frusto-conical head 22 of the male coupling member 20 and pass over the tapered surface of the head 22 to engage with the rearward face of the head 37. The spring 36 pulls the teeth 33 towards each other so that the coupling arrangement between the female member 25 and the male member 20, once made will not accidentally disengage. In order to disengage the coupling arrangement, the buttons 34 have to be pressed towards each other to act as a release means. This forces the teeth 33 apart against the biasing of the spring 36 allowing them to disengage from the rear face 37 of the frusto-conical head 22 of male member 20. The buttons 34 may be provided with surface serrations to assist with grip.

It will be appreciated that numerous modifications to the above described embodiment may be made without departing from the scope of the invention as defined in the appended claims. For example, the clip buckle assembly 3 may be provided with a further adjustment means whereby the second buckle member 8 is adjustably attached to the second end 17 of the strap 2.

Turning to the second embodiment of the invention, as shown in FIGS. 5A to 5C, a collar 1 made up of a strap 2 is shown which is closable into an annular loop by means of a buckle assembly. The clip buckle assembly is according to the first aspect of the invention and includes a clip buckle comprising a first member 4 having a housing 5 for receiving resilient tabs 6 on coupling arms 7 of a second buckle member 8.

The first buckle member 4 is attached to a toothed tongue 9 by means of a coupling joint 52. A slider 10 is arranged with the toothed tongue 9 passing through it. The slider 10 holds a ratchet (not shown) mounted on a rod 12 which is fastened to the slider 10. A lever 13 is operably connected to the ratchet and a spring (not shown) is positioned in the slider 10 to urge the ratchet towards the toothed tongue 9, whereby the ratchet engages with the teeth of the toothed tongue 9.

As for the first embodiment, the teeth on toothed tongue 9 are asymmetrically shaped, with shallow sloping faces on the sides of the teeth towards the distal end of the toothed tongue 9 and with steep faces on sides of the teeth towards the proximal end of the toothed tongue 9.

The toothed tongue 9 has a stop 60 at its distal end. In this embodiment, a mount 14 for the slider 10 is connected to the first end 16 of strap 2 through a sleeve 50. The toothed tongue 9 is arranged to pass through the sleeve 50, whereby in use, the toothed tongue 9 is positioned between the strap 2 and the animal to which the collar is attached. The toothed tongue 9 has a stop 60 at its distal end which prevents the toothed tongue 9 from being pulled through the sleeve 50 and so prevents accidental disengagement of the toothed tongue 9 from the slider 10.

The second buckle member 8 is attached to the second end 17 of the strap 2 at an interlocking coupling joint 52. 4 leash attachment means are distributed along the length of strap to, each attachment means being D-ring 43 acting as a locking key for each interlocking coupling joint 52.

Details of the buckle assembly are shown in FIGS. 6A to 6C. A protective flap 51 extends from inner face of the toothed tongue 9, underneath the coupling joint 52 and first buckle member 4. It can be seen from the figures that this protective flap 51 is arranged to form a shield between the buckle members 4, 8, when interlocked, and the body of an animal at the inner face of the collar 1 in use.

Details of the interlocking coupling joints 52 are shown in FIG. 7A to 7E. Each coupling joints comprises a first coupling member 40 and a second coupling member 41. The coupling members, 40, 41 are each provided with a recess 49 adapted to accept an end of the strap 2. The strap ends may be held in recess 49 by means of rivets 48 passing through holes 47 provided in each coupling member, with the rivets 48 passing through the strap 2 to hold the coupling members 40, 41 in place on the end of the strap 2.

The first coupling member 40 has four knuckles 46 which are arranged to interlace with three knuckles 45 of the second coupling member 41. Each knuckle is provided with a C shaped recess into which a rod or shaft may be clipped in order to interlock the first and second coupling members 40, 41 together. In the embodiment shown in FIGS. 7A to 7C, the straight portion 44, of a D-ring leash attachment means 43 acts as the rod or shaft to which the knuckles of the coupling members 40, 41 are clipped in order to interlocked them together.

In use, the open collar 1 of the second embodiment is slackened prior to its attachment around an animal's neck to form an annular loop. Slackening is achieved by pressing the lever 13 towards the toothed tongue 9 in order to release the ratchet from its engagement with the teeth of the toothed tongue 9. In this released configuration, the toothed tongue 9 can be slid through the slider 10 until the end stop 60 engages with the sleeve 50. Lever 13 is then released and the spring (not shown) biases the ratchet back in to contact with the toothed tongue 9. The teeth on the tongue are oriented so that as the first buckle member 4 is pushed towards the slider 10 the ratchet 11 can slide over the teeth and allow the toothed tongue 9 to pass freely through the slider 10. However, any attempt to move the first buckle member 4 in the opposite direction (i.e. slackening) will lead to the ratchet 11 engaging with the teeth of the toothed tongue 9 and preventing movement.

With the collar in its slackened configuration, it can be wrapped around the neck of an animal and formed into a closed annular loop by inserting the arms 7 of the second buckle member 8 into the housing 5 of first buckle member 4 so that the tabs 6 lockingly engage in the housing 5. The collar 1 can then be tightened around the animal's neck by urging the first 16 and second 17 ends of the strap 2 towards each other. This results in the slider 10 moving along the toothed tongue 9 in a direction towards the first buckle member 4 with the ratchet passing freely over the sloping surfaces of the teeth of toothed tongue 9. Movement of the slider 10 back over the teeth is prevented by their steep faces on the tooth edges facing towards the first buckle member 4. The ratchet, biased towards the toothed tongue 9 by the spring engages with these sharps edges of the teeth to prevent the slider moving back towards the stop and so prevents slackening of the collar. Alternatively, the collar 1 may be formed into a closed annular loop by inserting the arms 7 of the second buckle member 8 into the housing 5 of first buckle member 4 so that the tabs 6 lockingly engage in the housing 5 before the closed loop is passed over an animal's head, with the collar in its slackened configuration. Once in position around the animal's neck, the collar 1 may be tightened by pushing or pulling tongue 9 through slider 10 in a tightening direction.

Although the clip buckle assembly has been exemplified in the context of a dog collar, the invention is of use in many applications where it is required to provide rapid fastening together of ends of straps, belts, webbing collars and the like with the capability to easily adjust the spacing of the ends. For instance, the clip buckle assembly of the invention, in addition to being of use as a fastening for animal collars, particularly dog collars, may be used as rapid and adjustable fasteners in such applications as . . . .

. . . life vests, water buoyancy jackets, etc.,
general clothing jackets,
belts—including belts for clothing,
cable ties, such as electrical cable ties,
attachment of gas tanks for scuba diving, to a person or for carriage on a vessel,
attachment of blankets, rugs, head collars, bridles, girth straps and the like to horses,
child restraints, for instance for buggy and car seats,
intensive care hospital patients—securing of intravenous drips, catheters and the like to a patient or to a support means,
sport and leisure equipment such as rucksacks, backpacks and sports bags,
marine applications—sail ties and securing of items on a vessel, . . . .
. . . and many others.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A collar for an animal comprising:
    a strap; and
    a clip buckle assembly operably attached to first and second ends of the strap for closing the strap into an annulus around an animal's neck;
    said clip buckle assembly having two releasably interlockable buckle members, one buckle member having a resilient arm received in a housing in the other buckle member, the housing having a coupling aperture to receive a coupling tab provided on the resilient arm, and an adjustment arrangement wherein the adjustment arrangement comprises a first tongue extending between the first buckle member and a first stop, the first buckle member being located at a proximal end of the first tongue and the first stop being located at a distal end of the first tongue, and a first slider through which the first tongue is arranged to pass;
    wherein the first slider comprises a first gripping arrangement configurable between an open configuration, wherein the first tongue is free to slide through the first slider and a closed configuration, wherein the first tongue is held locked against the first slider when the first slider is urged in a slackening direction from the proximal towards the distal end of the first tongue, whereby the slider is arranged to be fixable against slackening at any of a plurality of positions along the first tongue;
    the first stop is arranged to prevent the tongue from disengaging from the slider when the first slider is urged in the slackening direction, and
    the first slider is attached to the first end of the strap whereby the first buckle member is adjustably attached to the first end of the strap and the second buckle member is attached to a second end of the strap;
    wherein from a position in which the first gripping arrangement is in the closed configuration the slider is movable relative to the tongue in the direction from the distal end to the proximal end of the tongue.

2. The collar of claim 1 wherein the first tongue is arranged with its distal end against an inner face of the collar in use, and wherein the first gripping arrangement is arranged to be configurable between the open and closed configurations on the outside face of the collar in use.

3. The collar of claim 1 wherein the first gripping arrangement is a cam buckle arranged to press the first tongue towards the first slider in the closed configuration whereby the first tongue is held locked against the first slider by the cam buckle when the first slider is urged in a slackening direction from the proximal towards the distal end of the first tongue.

4. The collar of claim 1 wherein the first tongue is a first toothed tongue and the first gripping arrangement is a first ratchet biased to press against the first toothed tongue, wherein the first toothed tongue and first ratchet are mutually arranged so that the first slider is moveable along the first toothed tongue when urged in a tightening direction along the first toothed tongue, from the distal towards the proximal end of the first toothed tongue, and wherein the first ratchet is arranged to lock the first slider against the first toothed tongue when the first slider is urged in a slackening direction from the proximal towards the distal end of the first toothed tongue.

5. The collar of claim 1, wherein the first slider comprises a arrangement for disengaging the first ratchet from the first toothed tongue whereby the first slider is moveable in the slackening direction when the first ratchet is disengaged.

6. The collar of claim 1 wherein the buckle assembly comprises a further adjustment arrangement and wherein the further adjustment arrangement comprises a second tongue extending between the second buckle member at a proximal end of the second tongue and a second stop at a distal end of the second tongue, and a second slider through which the second tongue is arranged to pass;
    wherein the second slider comprises a second gripping arrangement configurable between an open configuration, wherein the second tongue is free to slide through the second slider and a closed configuration, wherein the second tongue is held locked against the second slider when the second slider is urged in a slackening direction from the proximal towards the distal end of the second tongue, whereby the second slider is arranged to be fixable at any of a plurality of positions along the second tongue; and wherein the second stop arranged to prevent the tongue from disengaging from the slider when the second slider is urged in the slackening direction.

7. The collar of claim 6 wherein the second tongue is arranged with its distal end against an inner face of the collar in use, and wherein the first gripping arrangement is arranged to be configurable between the open and closed configurations on the outside face of the collar in use.

8. The collar of claim 1 comprising a protective flap arranged to form a shield between the interlocked buckle members and the body of an animal at an inner face of the collar in use.

9. The collar of claim 1 wherein the strap comprises one or more strap segments releasably connected by interlockable connection joints.

10. The collar of claim 9 wherein the collar comprises a plurality of mount assemblies, each adapted to releasably hold a leash attachment arrangement, wherein the interlockable connection joints are arranged to act as the mount assemblies adapted to releasably hold the leash attachment arrangement.

11. The collar of claim 10 wherein each interlockable connection joint comprises first and second interlocking coupling members each arranged to releasably attach to the same leash attachment arrangement whereby the first and second coupling members form the interlockable connection joint at and through the leash attachment arrangement.

12. The collar of claim 10 wherein the one or more leash attachment arrangement is a male or female coupling member adapted to engage with a complementary female or male coupling member at a distal end of a leash to provide a coupling arrangement between the collar and said leash.

13. The collar of claim 10, comprising a leash assembly having a coupling member at its distal end, the coupling member adapted to engage with one of the plurality of the leash attachment arrangement of the collar to provide a coupling arrangement.

14. The collar of claim 13 wherein at least one leash attachment arrangement is male or female coupling member adapted to engage with a complementary female or male coupling member at the distal end of a leash, and wherein the female coupling member is arranged to grasp the male coupling member on insertion and to hold the male coupling member to form the coupling arrangement, the female coupling member further comprising a release arrangement arranged to release the male coupling member from the coupling arrangement when actuated.

15. The collar of claim 1 wherein the one buckle member has a pair of said resilient arms received in a housing in the other buckle member, the housing having a pair of said coupling apertures to each respectively receive a coupling tab provided on each resilient arm.

16. The collar of claim 1 wherein the first slider is fixedly attached to the first end of the strap.

* * * * *